United States Patent
Tsai (10) Patent No.: US 9,435,486 B2
(45) Date of Patent: Sep. 6, 2016

(54) HAND-HELD REFILLABLE GAS CONTAINER AND FILLING NOZZLE THEREOF

(71) Applicant: Wei-Ming Tsai, New Taipei (TW)

(72) Inventor: Wei-Ming Tsai, New Taipei (TW)

(*) Notice: Subject to any disclaimer, the term of this patent is extended or adjusted under 35 U.S.C. 154(b) by 101 days.

(21) Appl. No.: 14/312,000

(22) Filed: Jun. 23, 2014

(65) Prior Publication Data

US 2015/0260338 A1 Sep. 17, 2015

(30) Foreign Application Priority Data

Mar. 11, 2014 (TW) .............................. 103108440 A (51) Int. Cl.
*F17C 1/00* (2006.01)
*F16K 1/30* (2006.01)
*F17C 13/04* (2006.01)

(52) U.S. Cl.
CPC ................ *F17C 1/00* (2013.01); *F16K 1/303* (2013.01); *F17C 13/04* (2013.01); *F17C 2201/0104* (2013.01); *F17C 2201/032* (2013.01); *F17C 2201/058* (2013.01); *F17C 2203/0617* (2013.01); *F17C 2203/0636* (2013.01); *F17C 2205/0323* (2013.01); *F17C 2205/0329* (2013.01); *F17C 2205/0382* (2013.01); *F17C 2205/0397* (2013.01); *F17C 2221/035* (2013.01); *F17C 2223/0153* (2013.01); *F17C 2223/033* (2013.01); *F17C 2223/043* (2013.01); *F17C 2225/046* (2013.01); *F17C 2265/06* (2013.01); *F17C 2270/0709* (2013.01); *F17C 2270/0745* (2013.01)

(58) Field of Classification Search
CPC .......... F17C 1/00; F16K 1/303; F16K 1/304; F16K 1/306; F16K 1/30; F16K 1/301; F16K 1/307; F16K 1/308
USPC ........................................... 206/0.6; 220/581
See application file for complete search history.

(56) References Cited

U.S. PATENT DOCUMENTS

| 2012/0091380 A1* | 4/2012 | Newman | F16K 1/306 251/324 |
| 2012/0111740 A1* | 5/2012 | Coleman | B01L 5/02 206/0.6 |

* cited by examiner

*Primary Examiner* — Anthony Stashick
*Assistant Examiner* — Robert Poon
(74) *Attorney, Agent, or Firm* — Guice Patents PLLC (57) ABSTRACT

The present invention relates to a hand-held refillable gas container, which includes a metal can body for storing liquid gas, and the top and the bottom of the can body are respectively installed with a gas discharge part and a filling nozzle; wherein the gas discharge part includes a connection ring and a discharge nozzle disposed in the connection ring; and the filling nozzle is able to be connected to a discharge nozzle of a conventional canned gas, thereby allowing liquid gas to be filled and stored in the can body. Accordingly, the gas container provided by the present invention has advantages of allowing a user to easily hold and carry around for satisfying different combustion requirements and various operation environments.

17 Claims, 9 Drawing Sheets

HAND-HELD REFILLABLE GAS CONTAINER AND FILLING NOZZLE THEREOF

BACKGROUND OF THE INVENTION

1. Field of the Invention

The present invention relates to a gas container, especially to a gas container capable of being repeatedly refilled and storing high-pressure liquid gas and allowing a user to easily hold and carry around. The present invention also provides a filling nozzle of a gas container.

2. Description of Related Art

Fire is generated because of the massive oxidation happened during a combustion process so as to generate light and heat, and it is also a means of energy releasing. In addition, fire is a must have element in our lives, with fire, we can cook food, can be provided with lighting, and the fire can also be used for combustion operations such as forging, soldering and welding. As such, the fuel, e.g. gas, is often formed in a gaseous status and the gas has to be stored in a high-pressure-sustainable metal container, for example a gas tank or a canned gas for ensuring the operation safety.

The top of a conventional gas tank is installed with a control valve for allowing the gas to filled or outputted, in other words the control valve is a bidirectional valve when being in an opened status. As such, the control valve of the gas tank is connected to a gas stove through a flexible connection pipe for the purpose of cooking food. However, the size of the gas tank is rather larger, if a combustion tool is used for a combustion operation such as forging, soldering and welding, the combustion operation has to be processed at a location close to the gas tank, so no convenience is provided.

For meeting a requirement of making the gas container smaller, the skilled people in the art has developed various types of canned gas, the top of the canned gas is also installed with a control valve which is set to be closed in a normal status, and the filling operation is to utilize high pressure to enable the liquid gas to pass the control valve and be filled in a can body, thereby allowing the canned gas to be provided with an advantage of easy to be carried around. However, the canned gas is defined as low pressure, e.g. 2 $kg/cm^2$, so the vaporization temperature of the gas is relatively high, when subject to a low temperature environment, e.g. zero Celsius degree, the liquid gas inside the canned gas is hard to be vaporized and unable to be supplied to a gas stove or a combustion tool for the purpose of combusting. In addition, a conventional low-pressure gas container is not installed with a filling nozzle, when the liquid gas inside the container ran out, the container would be thrown away thereby causing unnecessary wastes.

As such, a high-pressure, e.g. 10 $kg/cm^2$, canned gas is developed, the vaporization temperature for the gas inside the high-pressure canned gas is relatively low, so when subject to a low temperature environment, e.g. −20 to −30 Celsius degree, the liquid gas inside the canned gas can still be vaporized and supplied to the stove or the combustion tool for the purpose of combusting. However, the disadvantage of the high-pressure canned gas is that the dimension is rather large, e.g. 74 mm in diameter and 274 mm in height, so when being assembled with a combustion tool, the whole assembly is heavy so the user may feel tired after using it for a short period of time; moreover, the large dimension of the canned makes the combustion operation harder to be processed in a small space; furthermore, the high-pressure canned gas is not installed with a filling nozzle, so when the liquid gas inside the container ran out, the container would be thrown away thereby causing unnecessary wastes.

Accordingly, how to invent a gas container capable of being repeatedly refilled and storing high-pressure liquid gas and allowing a user to easily hold and carry around for satisfying different combustion requirements and various operation environments shall be seriously concerned by the skilled people in the art.

SUMMARY OF THE INVENTION

One primary objective of the present invention is to provide a hand-held refillable gas container, which is capable of being repeatedly refilled and storing high-pressure liquid gas and allowing a user to easily hold and carry around for satisfying different combustion requirements and various operation environments.

For achieving aforesaid objective, one technical solution provided by the present invention is to provide a hand-held refillable gas container, which includes a metal can body for storing liquid gas, and the top and the bottom of the can body are respectively installed with a gas discharge part and a filling nozzle; the gas discharge part includes a connection ring and a discharge nozzle disposed in the connection ring; the filling nozzle includes a first valve seat, the interior of the first valve seat is axially formed with a stepped seat hole composed of a top seat hole and a bottom seat hole, and a first thimble is disposed in the seat hole, thereby allowing the lower portion of the first thimble to be protruded out from the bottom seat hole, an inner sleeve is provided in the top seat hole, and a first spring is disposed between the first thimble and a sleeve hole formed in the inner sleeve, thereby allowing the first thimble to axially and elastically retract in the sleeve hole; wherein the outer periphery of the inner sleeve is axially and annularly formed with a plurality of guide slots communicated with the top seat hole, the interior of the first thimble is axially formed with a thimble hole, a neck part defined at the upper portion of the outer periphery is radially formed with a neck hole communicated with the thimble hole, and when the neck hole and the bottom seat hole are not in a gas filling status, the neck hole and the bottom seat hole are shielded by a sealing ring which is sleeved with the neck part, thereby forming an airtight status; when the liquid gas is filled, the first thimble is upwardly moved along the inner sleeve so as to compress the first spring, and the sealing ring is upwardly moved with the first thimble and abutted against the bottom of the inner sleeve thereby enabling the neck hole and the bottom seat hole to be respectively opened, so the liquid gas is allowed to enter the sleeve hole through the neck hole and be filled and stored in the can body, and the gas in the can body is allowed to be discharged to the exterior through the bottom seat hole.

Another objective of the present invention is to provide a filling nozzle of a gas container, which has an advantage of allowing the gas in the gas container to be discharged during a filling process thereby facilitating liquid gas to pass the filling nozzle.

For achieving aforesaid objective, one technical solution provided by the present invention is to provide a filling nozzle of a gas container, which includes a first valve seat, the interior of the first valve seat is axially formed with a stepped seat hole composed of a top seat hole and a bottom seat hole, and a first thimble is disposed in the seat hole, thereby allowing the lower portion of the first thimble to be protruded out from the bottom seat hole, an inner sleeve is provided in the top seat hole, and a first spring is disposed between the first thimble and a sleeve hole formed in the inner sleeve, thereby allowing the first thimble to axially and elastically retract in the sleeve hole; wherein the outer periphery of the inner sleeve is axially and annularly formed with a plurality of guide slots communicated with the top seat hole, the interior of the first thimble is axially formed with a thimble hole, a neck part defined at the upper portion of the outer periphery is radially formed with a neck hole communicated with the thimble hole, and when the neck hole and the bottom seat hole are not in a gas filling status, the neck hole and the bottom seat hole are shielded by a sealing ring which is sleeved with the neck part, thereby forming an airtight status.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
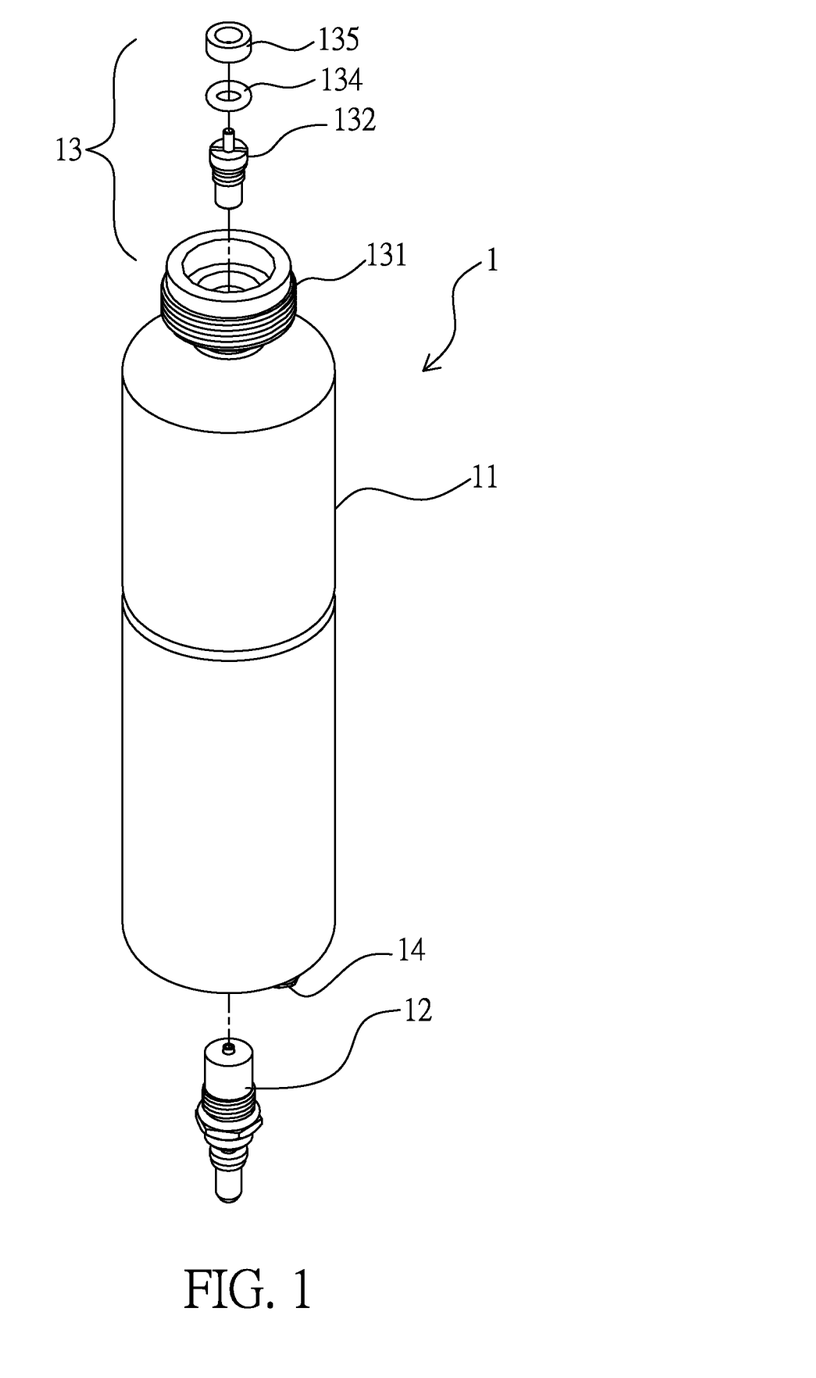
FIG. 1 is a perspective exploded view illustrating the gas container according to the present invention.
Figure 4:
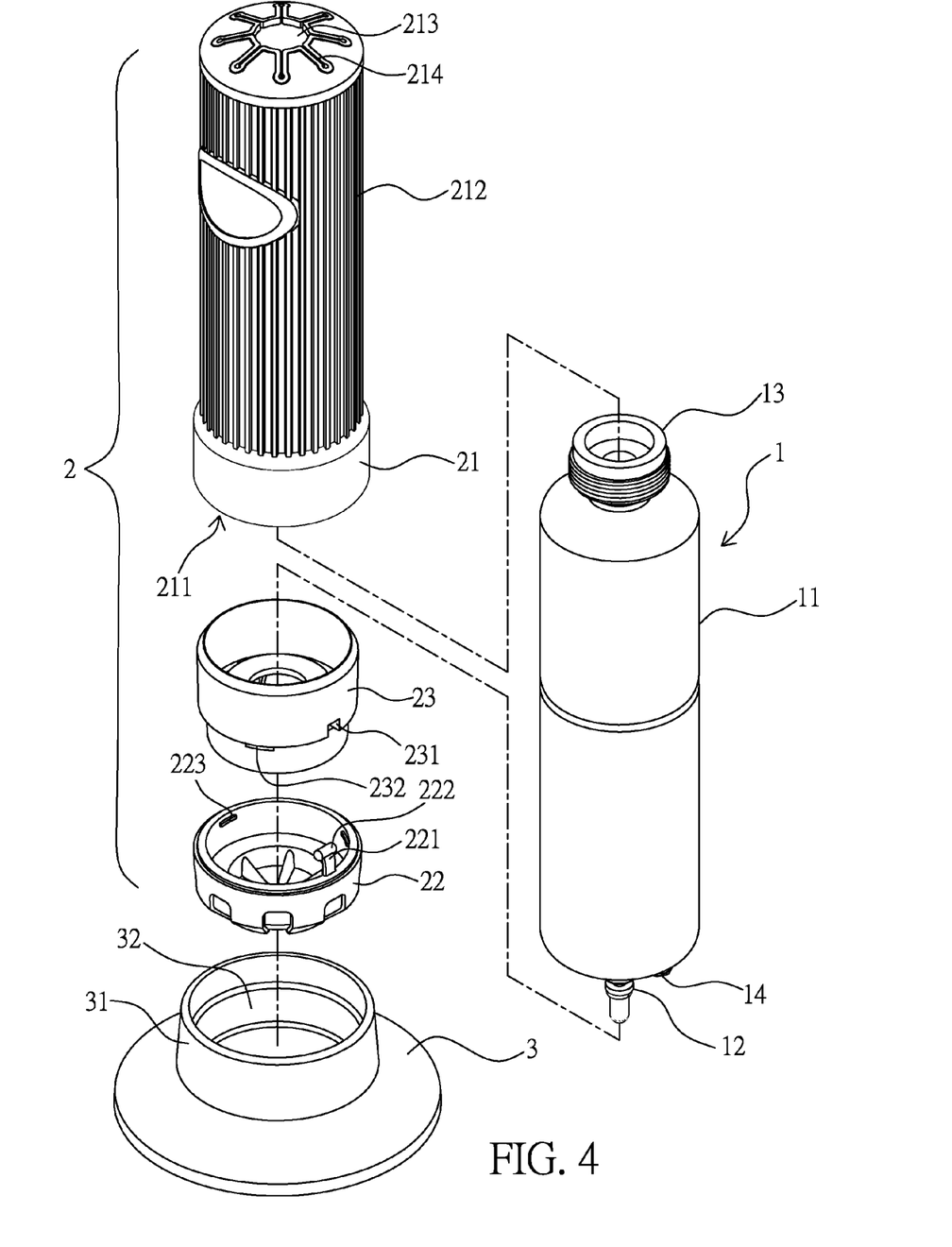
FIG. 4 is a perspective exploded view illustrating the gas container, the handgrip and the base according to the present invention.
Figure 5:
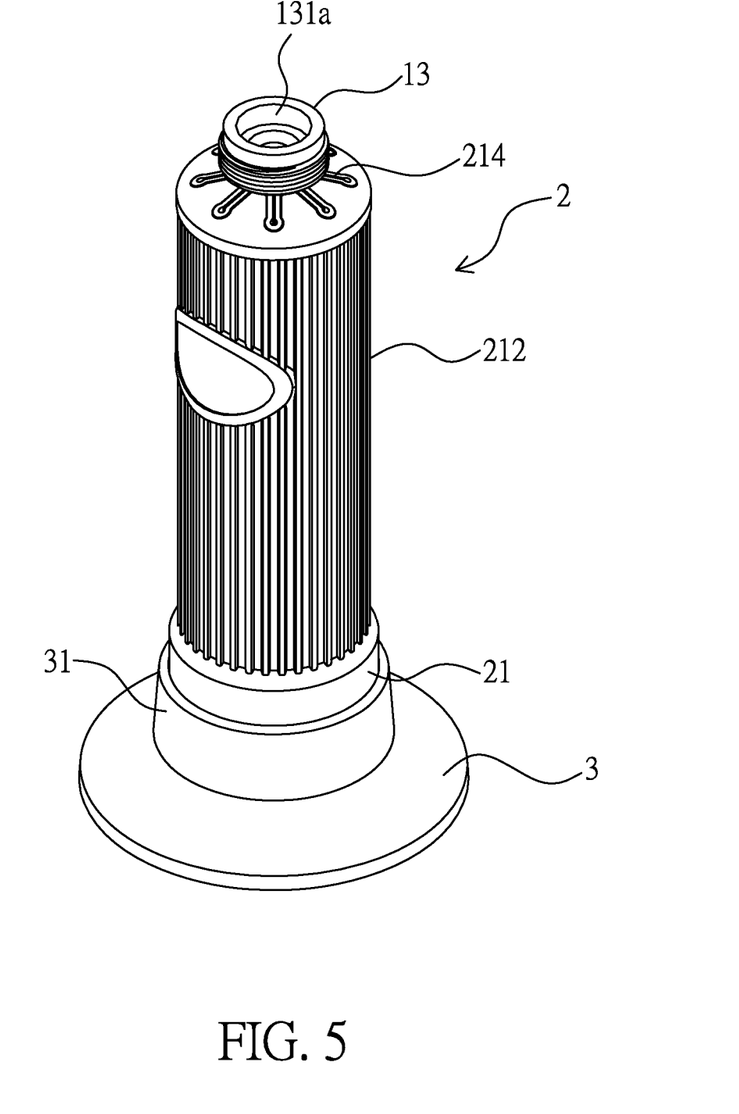
FIG. 5 is a perspective view illustrating the assembly of the gas container, the handgrip and the base shown in FIG. 4.

As shown in FIG. 1, the gas container 1 provided by the present invention includes a metal can body 11, a filling nozzle 12 and a gas discharge part 13. As shown in FIG. 4 or FIG. 5, the gas container 1 can be further installed in a handgrip 2, and the handgrip 2 is sleeved on a base 3, thereby allowing the gas container 1 to be protected and enclosed by the handgrip 2 and allowing the gas container 1 to be disposed on the base 3.

Wherein, the metal can body 11 is served to store liquid gas therein, especially high-pressure liquid gas. The bottom and the top of the can body 11 are respectively provided with the filling nozzle 12 and the gas discharge part 13. For allowing the can body 11 to be held conveniently, the dimension of the can body 11 is properly modified to be formed with a diameter of 40 mm and a height of 185 mm, so the can body 11 can be easily held and carried around by a user.

Figure 2:
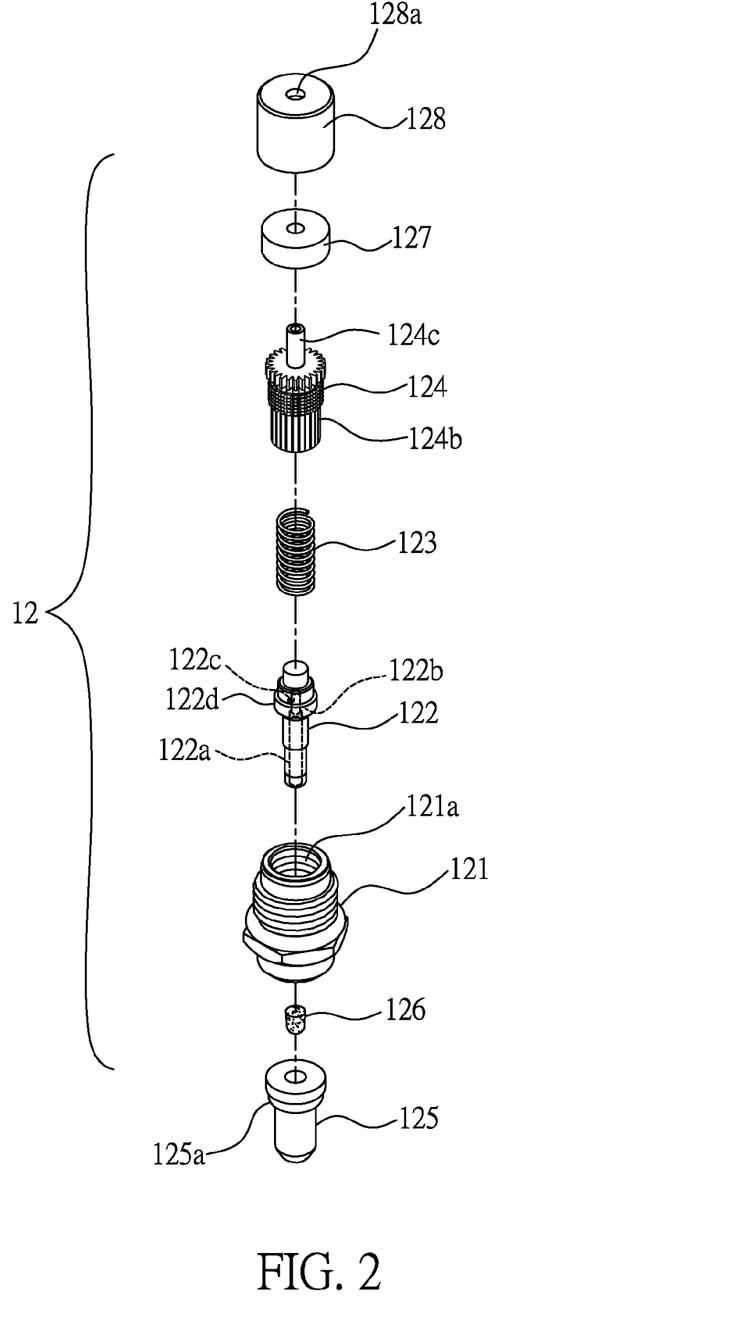
FIG. 2 is a perspective exploded view illustrating the filling nozzle according to the present invention.
Figure 6:
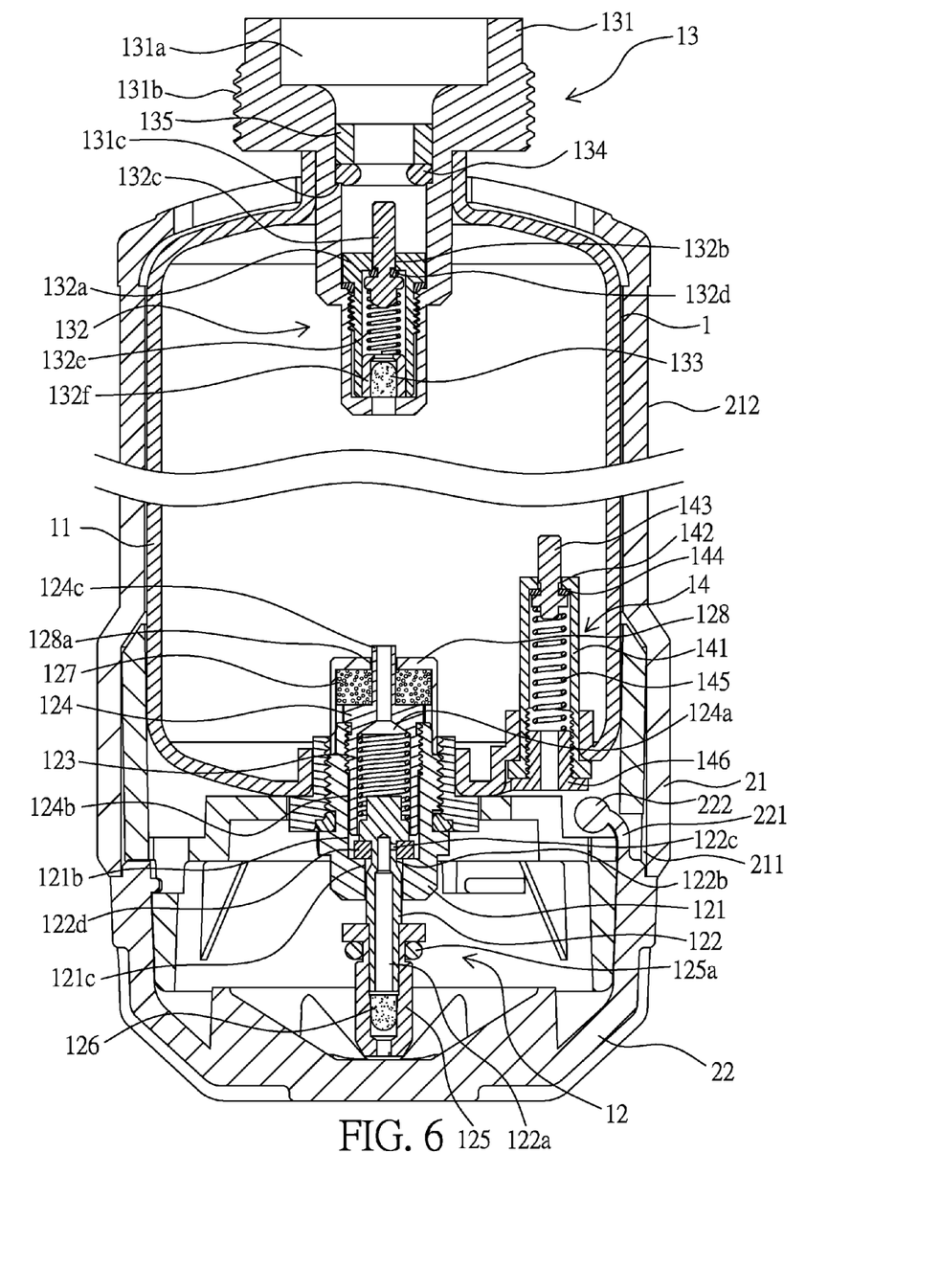
FIG. 6 is a cross sectional view illustrating the gas container yet being filled with liquid gas according to the present invention.

As shown in FIG. 2 and FIG. 6, the filling nozzle 12 includes a first valve seat 121 disposed on the bottom surface of the can body 11, a stepped seat hole 121a is axially formed in the first valve seat 121, and the seat hole 121a is formed with a top seat hole 121b having a relatively larger inner diameter and a bottom seat hole 121c having a relatively smaller inner diameter, and a stepped first thimble 122 is disposed in the seat hole 121a, thereby allowing the lower portion of the first thimble 122 to be protruded out of the bottom seat hole 121c, and an inner sleeve 124 is provided in the top seat hole 121b, a first spring 123 is disposed between the first thimble 122 and a sleeve hole 124a formed in the inner sleeve 124, thereby allowing the first thimble 122 to axially and elastically retract in the sleeve hole 124a.

Wherein, the outer periphery of the inner sleeve 124 is axially and annularly formed with a plurality of guide slots 124b, thereby allowing the gas inside the can body 11 to be discharged and allowing liquid gas to be filled.

In addition, the top surface of the inner sleeve 124 is axially protruded with a discharge pipe 124c communicated with the sleeve hole 124a, thereby allowing the liquid gas to be filled in the can body 11.

Moreover, the interior of the first thimble 122 is axially formed with a thimble hole 122a, a neck part 122b defined at the upper portion of the outer periphery is radially formed with a neck hole 122c communicated with the thimble hole 122a, and when the neck hole 122c is not in a gas filling status, the neck hole 122c is shielded by an elastic sealing ring 122d which is sleeved with the neck part 122b, thereby preventing the liquid gas from passing the neck hole 122c so as to form a sealed status.

Furthermore, the bottom of the first thimble 122 is sleeved with a connection pipe 125, and the outer periphery of the connection pipe 125 is sleeved with a first anti-leaking ring 125a so as to form an airtight effect during the filling. Wherein, the interior of the connection pipe 125 is provided with a first filtering material 126 adjacent to the bottom of the first thimble 122 and used for filtering the impurities which are about to enter the filling nozzle 12. The discharge pipe 124c is disposed adjacent to a second filtering material 127 for filtering the impurities discharged from the can body 11. A top cover 128 is disposed at the top of the first valve seat 121 for covering the second filtering material 127 and the top of the inner sleeve 124, and the discharge pipe 124c is protruded out from a cover hole 128a formed at the top of the top cover 128. Wherein, the first and the second filtering material 126, 127 are preferably to be a sintered member with micro pores formed through powder metallurgy or a sponge cushion.

Referring to FIG. 2 and FIG. 6, the filling nozzle 12 is firstly assembled as an individual member thereby allowing the filling nozzle 12 to be installed on the bottom surface of the can body 11, at this moment the first spring 123 is in a stretched status, so the sealing ring 122d of the first thimble 122 is enabled to constantly seal the bottom seat hole 121c so as to form an airtight status; in other words, the liquid gas inside the can body 11 is able to enter the top cover 128 through a gap formed between the discharge pipe 124c and the cover hole 128a, and filtered by the second filtering material 127 and passed the guide slots 124b of the inner sleeve 124 for allowing the liquid gas to be filled in the top seat hole 121b, but the liquid gas is stopped by the sealing ring 122d thereby not being able to pass the bottom seat hole 121c for being discharged out from the filling nozzle 12. In addition, the neck hole 122c is shielded by the sealing ring 122d, so the liquid gas inside the can body 11 is unable to pass the first thimble 122 and the connection pipe 125 for being discharged out from the filling nozzle 12.

Figure 7:
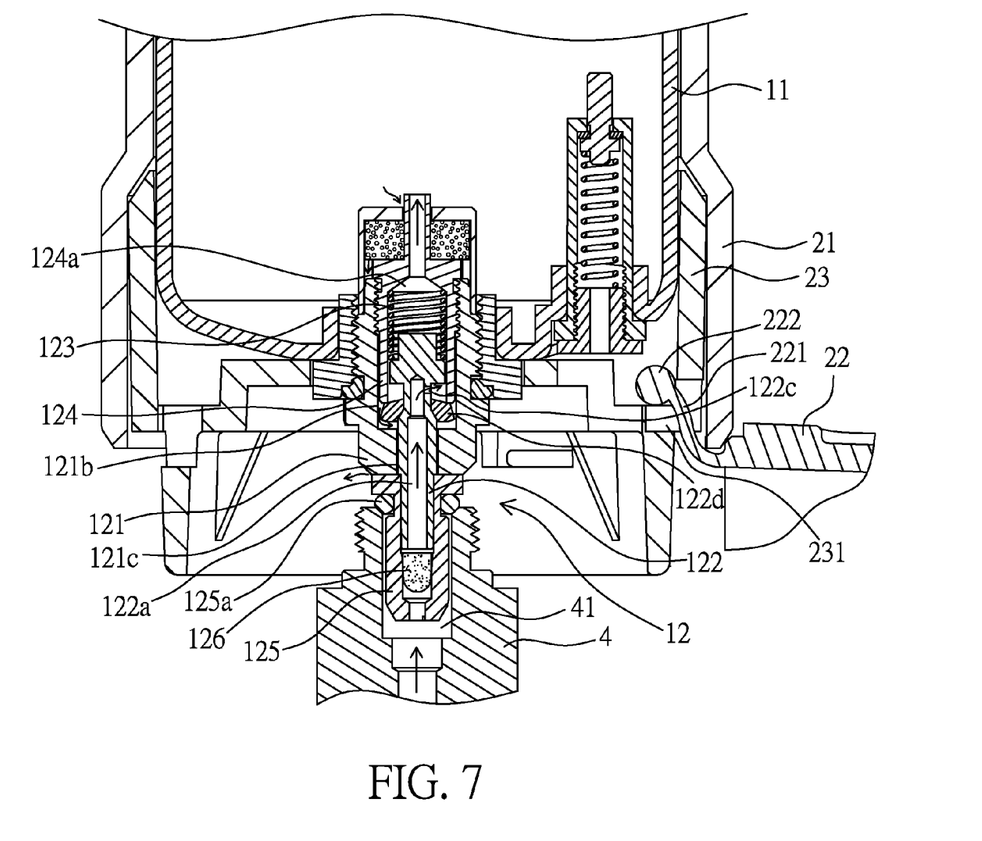
FIG. 7 is a cross sectional view illustrating the gas container being filled with liquid gas according to the present invention.

Referring to FIG. 7, if a high-pressure gas filling operation is desired to be processed, a discharge nozzle 4 of a conventional high-pressure canned gas is inserted in the connection pipe 125 of the filling nozzle 12, and the first anti-leaking ring 125a is disposed adjacent to an opening 41 formed on the discharge nozzle 4 thereby forming an airtight effect, and the top surface of the connection pipe 125 is abutted against the bottom surface of the first valve seat 121 thereby allowing the connection pipe 125 and the first thimble 122 to be upwardly moved along the inner sleeve 124 so as to compress the first spring 123, and the sealing ring 122d is upwardly moved with the first thimble 122 and abutted against the bottom of the inner sleeve 124, so the bottom seat hole 121c is opened, and the neck hole 122c is exposed because the upward movement of the connection pipe 125 and the first thimble 122 is greater than the upward movement of the sealing ring 122d; at this moment, the above-mentioned gas filtered by the second filtering material 127 and filled in the top seat hole 121b is enabled to be discharged to the exterior because the sealing ring 122d allows the bottom seat hole 121c to be opened. The liquid gas inside the high-pressure canned gas is only allowed to enter from the connection pipe 125 and filtered by the first filtering material 126, and the filtered liquid gas passes the thimble hole 122a and the neck hole 122c of the first thimble 122 and enters the sleeve hole 124a of the inner sleeve 124 thereby being able to be filled through the discharge pipe 124c and stored in the can body 11.

When the can body 11 is filled and a saturated status is formed, the excessive liquid gas is discharged through the first thimble 122, the connection pipe 125 and the bottom seat hole 121c and the gas filling operation is terminated.

Figure 3:
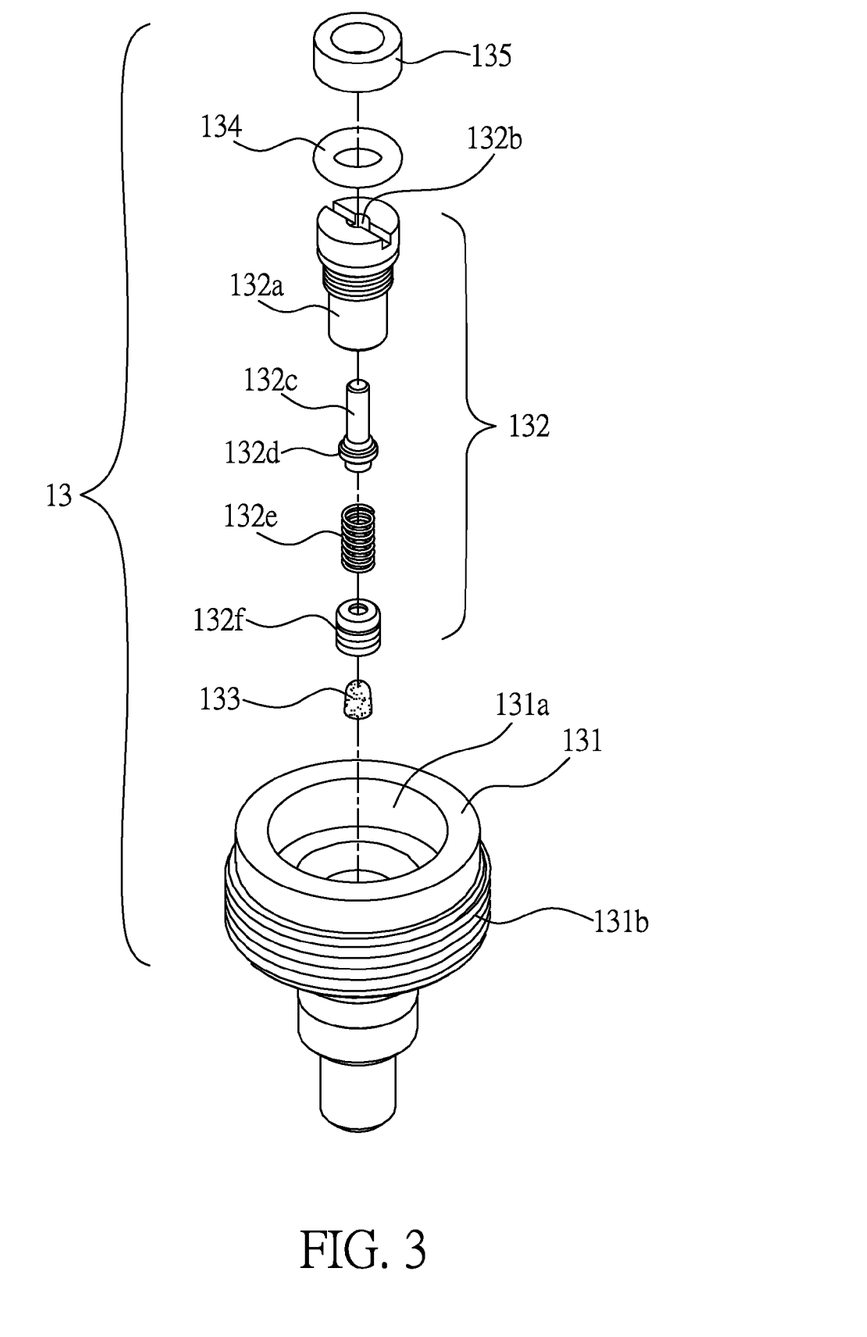
FIG. 3 is a perspective exploded view illustrating the discharge nozzle according to the present invention.

As shown in FIG. 1, FIG. 3 and FIG. 6, the gas discharge part 13 includes a connection ring 131 disposed on the top surface of the can body 11, and a discharge nozzle 132 disposed in the connection ring 131. The connection ring 131 is axially formed with a stepped connection port 131a, and the outer periphery of the connection ring 131 or the connection port 131a is formed with a thread segment 131b for being connected to a conventional gas combustion tool. The discharge nozzle 132 is combined, e.g. screw-fitted, at the bottom of the connection port 131a, and the discharge nozzle 132 includes a second valve seat 132a, the top of the second valve seat 132a is axially formed with a valve hole 132b, and a stepped second thimble 132c is disposed in the valve hole 132b, thereby allowing the upper portion of the second thimble 132c to be protruded out from the valve hole 132b, and a second anti-leaking ring 132d sleeved at the outer periphery of the second thimble 132c is enabled to constantly seal the valve hole 132b so as to form an airtight effect.

In addition, the bottom of the second thimble 132c is connected to one end of a second spring 132e, and an inner end cover 132f is combined, e.g. screw-fitted, at the bottom of the valve hole 132b, thereby allowing the other end of the second spring 132e to be abutted against the top of the inner end cover 132f, and the upper portion of the second thimble 132c is able to axially and elastically retract in the valve hole 132b so as to control the liquid gas supply.

Moreover, the interior of the inner end cover 132f is provided with a third filtering material 133 for filtering the impurities in the can body 11. Wherein, the third filtering material 133 is preferably to be a sintered member with micro pores formed through powder metallurgy or a sponge cushion.

Furthermore, the inner mid portion of the connection port 131a of the connection ring 131 is formed with a stepped flange 131c, the top of the flange 131c is in sequence provided with a third anti-leaking ring 134 and a guide ring 135 thereby allowing a connection nozzle of the conventional gas combustion tool to be installed and allowing an airtight status to be formed.

Figure 8:
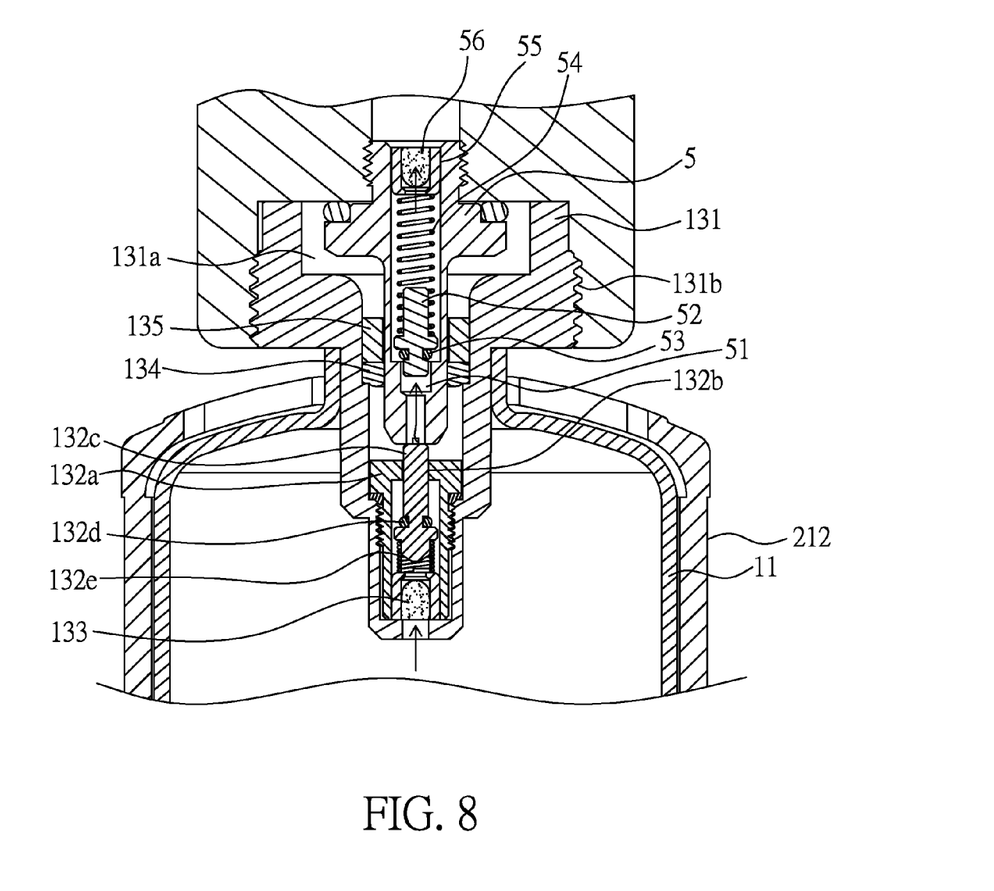
FIG. 8 is a cross sectional view illustrating the gas container being in a gas filling status according to the present invention.

Referring to FIG. 8, the interior of a connection nozzle 5 of the conventional gas combustion tool is axially formed with a stepped nozzle hole 51, and a stepped fourth thimble 52 is disposed in the nozzle hole 51, a fifth anti-leaking ring 53 sleeved at the outer periphery of the fourth thimble 52 is enabled to constantly seal the bottom of the nozzle hole 51 thereby forming an airtight effect. In addition, the fourth thimble 52 is connected to one end of a fourth spring 54, and a top end cover 55 is combined, e.g. screw-fitted, at the top of the nozzle hole 51, thereby allowing the other end of the fourth spring 54 to be abutted against the bottom of the top end cover 55, and the lower portion of the fourth thimble 52 is able to axially and elastically retract at the bottom of the nozzle hole 51 so as to control the connection nozzle 5 to be opened or closed.

Moreover, the interior of the top end cover 55 is provided with a fourth filtering material 56 for filtering the impurities which are able to enter the gas combustion tool. Wherein, the fourth filtering material 56 is preferably to be a sintered member with micro pores formed through powder metallurgy or a sponge cushion.

If a combustion operation is desired to be processed, the can body 11 has to be served to supply fuel gas to the gas combustion tool, so the gas combustion tool is connected, e.g. screw-fitted, to the thread segment 131b of the connection ring 131, the connection nozzle 5 is enabled to be inserted in the connection port 131a of the connection ring 131 and pass the guide ring 135 and tightly enclosed by the third anti-leaking ring 134, thereby forming an airtight effect; and the bottom of the connection nozzle 5 presses the second thimble 132c, so when the second thimble 132c and the third anti-leaking ring 134 are downwardly moved, the valve hole 132b is synchronously opened and the second spring 132e is compressed. The high-pressure liquid gas inside the can body 11 is filtered by the third filtering material 133, so the filtered gaseous/liquid mixture is allowed to pass the valve hole 132b of the second valve seat 132a and enter the connection nozzle 5 of the gas combustion tool, because the pressure of the filtered gaseous/liquid mixture is greater than the elastic force of the fourth spring 54, the fourth thimble 52 and the fifth anti-leaking ring 53 are pressed for being upwardly moved, and the nozzle hole 51 is synchronously opened and the fourth spring 54 is compressed, thereby allowing the gaseous/liquid mixture to be filtered by the fourth filtering material 56 then enter the gas combustion tool for processing the combustion operation.

Furthermore, referring to FIG. 6, for ensuring the operation safety of the gas container 1, a proper location, e.g. the bottom surface, of the can body 11 is further provided with a safety valve 14, wherein the safety valve 14 include a third valve seat 141, the top of the third valve seat 141 is axially formed with a penetrated hole 142, a stepped third thimble 143 is disposed in the penetrated hole 142, thereby allowing the third thimble 143 to be protruded out from the penetrated hole 142, and a fourth anti-leaking ring 144 sleeved at the outer periphery of the third thimble 143 is enabled to constantly seal the penetrated hole 142, thereby forming an airtight effect. In addition, the bottom of the third thimble 143 is connected to one end of a third spring 145, and a bottom end cover 146 is combined, e.g. screw-fitted, at the bottom of the penetrated hole 142 of the third valve seat 141, thereby allowing the other end of the third spring 145 to be abutted against the top of the bottom end cover 146, and the upper portion of the third thimble 143 is able to axially and elastically retract in the penetrated hole 142 so as to prevent the liquid gas inside the can body 11 from leaking.

Figure 9:
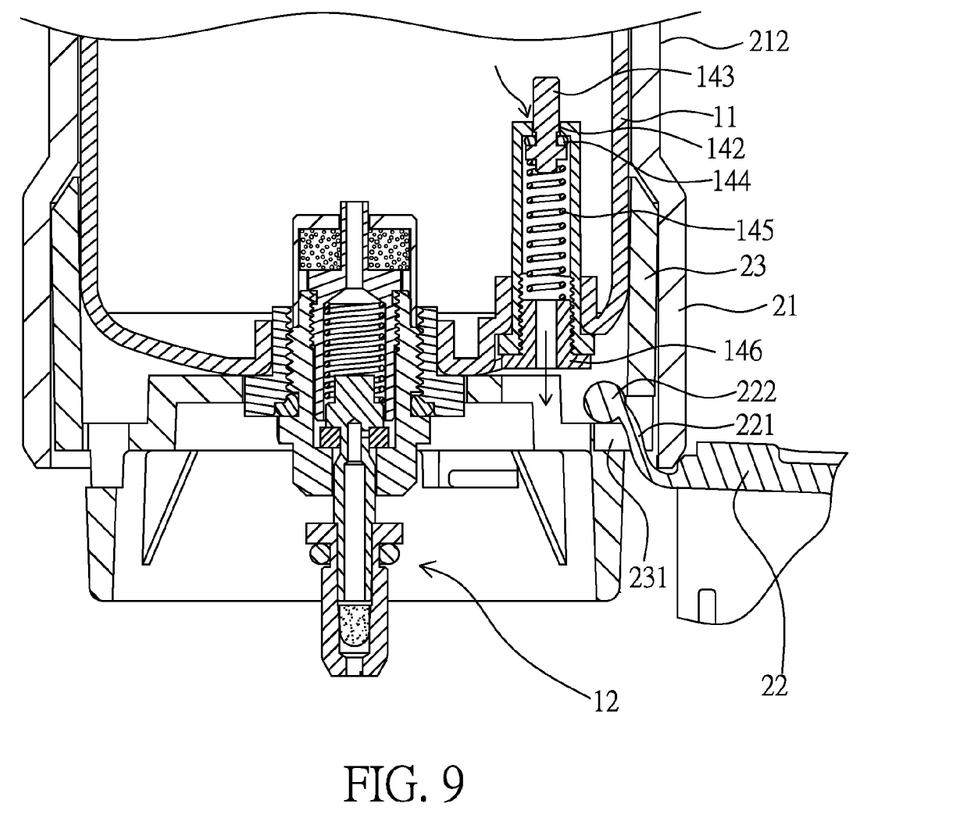
FIG. 9 is a cross sectional view illustrating the safety valve of the gas container processing the pressure releasing operation according to the present invention.

Referring to FIG. 9, when the gas container 1 is subject to a high temperature environment, e.g. being placed in a vehicle exposed under sunlight, when the temperature inside the vehicle is getting higher, the vaporization of the liquid gas is facilitated, so the pressure inside the can body 11 is rapidly increased; when the pressure inside the can body 11 is greater than the elastic force of the third spring 145, the third thimble 143 and the fourth anti-leaking ring 144 are pressed for being downwardly moved, and the penetrated hole 142 is synchronously opened and the third spring 145 is compressed, so the high-pressure gaseous/liquid mixture inside the can body 11 is enabled to pass the penetrated hole 142 and the bottom end cover 146 for being discharged to the exterior, thereby preventing the occurrence of explosion.

Referring from FIG. 4 to FIG. 7, for providing an anti-skid holding convenience, the gas container 1 is further installed in a handgrip 2. The handgrip 2 includes an anti-skid tube 21 made of an elastic polymer material, e.g. rubber, the bottom of the anti-skid tube 21 is axially formed with a tube hole 211 allowing the gas container 1 to be received therein, and the outer periphery thereof is formed with a plurality of convex/concave patterns 212, and the top thereof is formed with a through hole 213 allowing the gas discharge part 13 to be protruded, the circumference of the through hole 213 is connected with a plurality of radially-arranged extended slots 214 thereby facilitating the gas discharge part 13 to be protruded.

The handgrip 2 further includes a bottom cover 22 which can also be made of the above-mentioned elastic polymer material and sleeved at the bottom of the anti-skid tube 21 thereby allowing the filling nozzle 12 to be protected. As shown in FIG. 4, the bottom cover 22 is connected to the anti-skid tube 21 through a connection strip 221 thereby preventing the bottom cover 22 and the anti-skid tube 21 from being released. Moreover, the handgrip 2 further includes an intermediate ring 23 made of a rigid polymer material, e.g. plastic, and the intermediate ring 23 is formed as a stepped ring member, the upper portion thereof is clamped between the can body 11 and the bottom of the anti-skid tube 21, and the lower portion thereof is sleeved with the bottom cover 22, wherein the connecting location defined by the upper and the lower portions of the intermediate ring 23 is formed with a latch hole 231 corresponding to the connection strip 221 of the bottom cover 22, the latch hole 231 allows a tenon 222 transversally formed at the top of the connection strip 221 to be received, thereby allowing the bottom cover 22 to be connected to the intermediate ring 23, and engaging surfaces of the bottom cover 22 and the intermediate ring 23 can be correspondingly formed with a buckle tenon 223 and a buckle slot 232 capable of being mutually buckled, thereby allowing the bottom cover 22 to be in an opened status (as shown in FIG. 7) or in a closed status (as shown in FIG. 6) relative to the intermediate ring 23.

Referring from FIG. 4 to FIG. 6, when not in use, for allowing the gas container 1 to stand, the gas container 1 is further provided with a base 3. The base 3 is formed as a disk-like member, and a hollow column 31 at the center thereof is formed with a column hole 32 having the shape corresponding to the bottom of the handgrip 2, e.g. the bottom cover 22. As shown in FIG. 5, which is a perspective view illustrating the assembly of the gas container 1, the handgrip 2 and the base 3.

Based on what has been disclosed above, advantages achieved by the present invention are: the gas discharge part of the gas container is able to be directly connected to the gas combustion tool; with the installation of the filling nozzle, a function of repeatedly refilling liquid gas is provided, thereby prolonging the service life of the gas container and achieving an objective of environmental friendly; moreover, with the novel design of the can body of the gas container, high-pressure liquid gas is able to be stored therein, and the can body is very easy to be held and carried around by the user, so the gas container provided by the present invention can satisfy different combustion requirements and various operation environments. Accordingly, the gas container provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A hand-held refillable gas container, including:
a metal can body, for storing liquid gas, a gas discharge part located on a top of said can body and a filling nozzle located on a bottom of said can body; said gas discharge part including a connection ring and a discharge nozzle disposed in said connection ring; said filling nozzle including a first valve seat, an interior of said first valve seat being axially formed with a stepped seat hole composed of a top seat hole and a bottom seat hole, and a first thimble being disposed in said stepped seat hole, thereby allowing a lower portion of said first thimble to be protruded out from said bottom seat hole, an inner sleeve being provided in said top seat hole, and a first spring being disposed between said first thimble and a sleeve hole formed in said inner sleeve, thereby allowing said first thimble to axially and elastically retract in said sleeve hole; wherein an outer periphery of said inner sleeve being axially and annularly formed with a plurality of guide slots communicated with said top seat hole, an interior of said first thimble being axially formed with a thimble hole communicating with a bottom of said first thimble, a neck part defined at an upper portion of an outer periphery of said first thimble being radially formed with a neck hole communicating with said thimble hole, and a sealing ring being sleeved with said neck part, said sealing ring being movable between a first position and a second position, when said sealing ring is located in the first position, said neck hole and said bottom seat hole being sealed by said sealing ring and forming an airtight seal, when said sealing ring is located in the second position, said sealing ring is spaced apart from said neck hole and said bottom seat hole; when said hand-held refillable gas container is being filled with said liquid gas, said first thimble being upwardly moved along said inner sleeve so as to compress said first spring, and said sealing ring being upwardly moved with said first thimble and abutted against a bottom of said inner sleeve thereby enabling said neck hole and said bottom seat hole to be respectively opened, so the liquid gas being allowed to enter said sleeve hole through said neck hole and being filled and stored in said can body, and the gas in said can body being allowed to be discharged to an exterior through said bottom seat hole; wherein a top surface of said inner sleeve of said filling nozzle further includes a discharge pipe which is axially extended and communicated with said sleeve hole; said discharge pipe is inserted through a middle filtering material for filtering impurities discharged from said can body; a top cover is located on a top of said first valve seat for covering said middle filtering material and a top of said inner sleeve, and said discharge pipe protrudes outwardly from a cover hole formed in a top of said top cover.

2. The hand-held refillable gas container as claimed in claim 1, wherein said filling nozzle further includes a connection pipe, the outer periphery of said connection pipe is sleeved with a first anti-leaking ring, an interior of said connection pipe is provided with a lower filtering material adjacent to the bottom of said first thimble and used for filtering the impurities which are about to enter said filling nozzle.

3. The hand-held refillable gas container as claimed in claim 2, wherein said first and said middle filtering material are a sintered member with micro pores formed through powder metallurgy or a sponge cushion.

4. The hand-held refillable gas container as claimed in claim 1, wherein said first and said middle filtering material are a sintered member with micro pores formed through powder metallurgy or a sponge cushion.

5. The hand-held refillable gas container as claimed in claim 1, wherein said connection ring is axially formed with a stepped connection port, and the outer periphery of said connection ring or said connection port is formed with a thread segment, said discharge nozzle is combined at the bottom of said connection port, wherein the interior of said connection port is formed with a stepped flange, and the top of said flange is in sequence provided with a third anti-leaking ring and a guide ring.

6. The hand-held refillable gas container as claimed in claim 5, wherein said discharge nozzle includes a second valve seat, the top of said second valve seat is axially formed with a valve hole, and a second thimble is disposed in said valve hole, thereby allowing the upper portion of said second thimble to be protruded out from said valve hole, and a second anti-leaking ring sleeved at the outer periphery of said second thimble is enabled to constantly seal said valve hole; and an inner end cover is combined at the bottom of said valve hole, and a second spring is disposed between said inner end cover and said second thimble, thereby allowing the upper portion of said second thimble to axially and elastically retract in said valve hole.

7. The hand-held refillable gas container as claimed in claim 6, wherein the interior of said inner end cover is provided with an upper filtering material for filtering the impurities discharged from said can body; and said upper filtering material is a sintered member with micro pores formed through powder metallurgy or a sponge cushion.

8. The hand-held refillable gas container as claimed in claim 1, wherein a proper location of said can body is further provided with a safety valve, and said safety valve includes a third valve seat, the top of said third valve seat is axially formed with a penetrated hole, a third thimble is disposed in said penetrated hole, thereby allowing said third thimble to be protruded out from said penetrated hole, and a fourth anti-leaking ring sleeved at the outer periphery of said third thimble is enabled to constantly seal said penetrated hole; and a bottom end cover is combined at the bottom of said penetrated hole, and a third spring is disposed between said bottom end cover and said third thimble, thereby allowing the upper portion of said third thimble to axially and elastically retract in said penetrated hole.

9. The hand-held refillable gas container as claimed in claim 1, wherein said gas container further includes a handgrip; said handgrip includes: an anti-skid tube, the bottom of said anti-skid tube is axially formed with a tube hole allowing said gas container to be received therein, and the outer periphery thereof is formed with a plurality of convex/concave patterns, and the top thereof is formed with a through hole allowing said gas discharge part to be protruded; and a bottom cover sleeved at the bottom of said anti-skid tube, wherein said bottom cover is connected to said anti-skid tube through a connection strip.

10. The hand-held refillable gas container as claimed in claim 9, wherein the circumference of said through hole is connected with a plurality of radially-arranged extended slots.

11. The hand-held refillable gas container as claimed in claim 9, wherein said handgrip further includes an intermediate ring formed as a stepped ring member, the upper portion thereof is clamped between said can body and the bottom of said anti-skid tube, and the lower portion thereof is sleeved with said bottom cover, wherein said intermediate ring is formed with a latch hole corresponding to said connection strip of said bottom cover, said latch hole allows a tenon transversally formed at the top of said connection strip to be received, thereby allowing said bottom cover to be connected to said intermediate ring.

12. The hand-held refillable gas container as claimed in claim 11, wherein engaging surfaces of said bottom cover and said intermediate ring are correspondingly formed with a buckle tenon and a buckle slot capable of being mutually buckled.

13. The hand-held refillable gas container as claimed in claim 9, wherein said gas container further includes a base formed as a disk-like member, a hollow column at the center thereof is formed with a column hole having the shape corresponding to said bottom cover of said handgrip.

14. A filling nozzle of a gas container, including:
a first valve seat, an interior of said first valve seat being axially formed with a stepped seat hole composed of a top seat hole and a bottom seat hole, and a first thimble being disposed in said stepped seat hole, thereby allowing a lower portion of said first thimble to be protruded out from said bottom seat hole, an inner sleeve being provided in said top seat hole, and a first spring being disposed between said first thimble and a sleeve hole formed in said inner sleeve, thereby allowing said first thimble to axially and elastically retract in said sleeve hole; wherein an outer periphery of said inner sleeve being axially and annularly formed with a plurality of guide slots communicated with said top seat hole, an interior of said first thimble being axially formed with a thimble hole communicating with a bottom of said first thimble, a neck part defined at an upper portion of an outer periphery of said first thimble being radially formed with a neck hole communicating with said thimble hole, and a sealing ring being sleeved with said neck part, said sealing ring being movable between a first position and a second position, when said sealing ring is located in the first position, said neck hole and said bottom seat hole being sealed by said sealing ring and forming an airtight seal, when said sealing ring is located in the second position, said sealing ring is spaced apart from said neck hole and said bottom seat hole;

wherein a top surface of said inner sleeve of said filling nozzle further includes a discharge pipe which is axially extended and communicated with said sleeve hole; said discharge pipe is inserted through a middle filtering material for filtering impurities discharged from said can body; a top cover is located on a top of said first valve seat for covering said middle filtering material and a top of said inner sleeve, and said discharge pipe protrudes outwardly from a cover hole formed in a top of said top cover.

15. The filling nozzle of the gas container as claimed in claim 14, further including a connection pipe, the outer periphery of said connection pipe is sleeved with a first anti-leaking ring, an interior of said connection pipe is provided with a lower filtering material adjacent to the bottom of said first thimble and used for filtering the impurities which are about to enter said filling nozzle.

16. The filling nozzle of the gas container as claimed in claim 15, wherein said first and said middle filtering material are a sintered member with micro pores formed through powder metallurgy or a sponge cushion.

17. The filling nozzle of the gas container as claimed in claim 14, wherein said first and said middle filtering material are a sintered member with micro pores formed through powder metallurgy or a sponge cushion.

\* \* \* \* \*